(12) United States Patent
Crisp et al.

(10) Patent No.: US 11,554,771 B2
(45) Date of Patent: Jan. 17, 2023

(54) HYBRID VEHICLE WITH OPTIMIZED TRANSMISSION CONTROL DURING REGENERATIVE BRAKING

(71) Applicant: FORD GLOBAL TECHNOLOGIES, LLC, Dearborn, MI (US)

(72) Inventors: Nicholas Dashwood Crisp, Hadleigh (GB); James Christopher Wilkins, Maldon (GB); Tom Leroy, Dagenham (GB); Jonathan James Hall, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 342 days.

(21) Appl. No.: 16/993,892

(22) Filed: Aug. 14, 2020

(65) Prior Publication Data

US 2022/0048493 A1    Feb. 17, 2022

(51) Int. Cl.
*B60W 20/14*    (2016.01)
*B60W 20/30*    (2016.01)
*B60W 10/11*    (2012.01)
*B60W 10/04*    (2006.01)
*B60W 10/18*    (2012.01)

(52) U.S. Cl.
CPC ............ *B60W 20/14* (2016.01); *B60W 10/04* (2013.01); *B60W 10/11* (2013.01); *B60W 10/18* (2013.01); *B60W 20/30* (2013.01); *B60W 2510/083* (2013.01); *B60W 2710/10* (2013.01)

(58) Field of Classification Search
CPC .......... B60K 6/485; B60K 2006/4833; B60W 10/04; B60W 10/06; B60W 10/08; B60W 10/11; B60W 10/18; B60W 10/184; B60W 20/14; B60W 30/18127; B60W 50/0098; B60W 2050/0026; B60W 2510/083; B60W 2510/1005; B60W 2540/12; B60W 2710/10; B60W 2720/106; B60W 20/30; Y02T 10/62
USPC ............................................... 701/22
See application file for complete search history.

(56) References Cited

U.S. PATENT DOCUMENTS

| 9,415,764 B2 | 8/2016 | Zhang et al. |
|---|---|---|
| 10,239,514 B2 | 3/2019 | Madurai-Kumar et al. |
| 10,308,120 B2 | 6/2019 | Zhao et al. |
| 2003/0188419 A1* | 10/2003 | Wingeier ............... H02K 15/16 29/736 |
| 2018/0306157 A1* | 10/2018 | Lee ................... B60W 30/1843 |

FOREIGN PATENT DOCUMENTS

| CN | 103129550 B | 1/2019 |
|---|---|---|
| KR | 20160045364 A | 4/2016 |

* cited by examiner

*Primary Examiner* — B M M Hannan
(74) *Attorney, Agent, or Firm* — David B Kelley; Brooks Kushman P.C.

(57) ABSTRACT

A hybrid vehicle includes an engine, an electric machine configured to apply a negative torque during regenerative braking, and a multi-speed transmission coupled to the engine and having multiple discrete gear ratios. A controller is programmed to, in response to a request to decelerate the vehicle, command a shift of the transmission to a one of the gear ratios that is predetermined to rotate the electric machine at a speed that generates a regenerative-braking torque corresponding to a target deceleration of the vehicle without application of friction brakes.

20 Claims, 4 Drawing Sheets

HYBRID VEHICLE WITH OPTIMIZED TRANSMISSION CONTROL DURING REGENERATIVE BRAKING

TECHNICAL FIELD

This disclosure relates to hybrid vehicles and more particularly to operating a transmission to optimize regenerative braking through proper gear matching.

BACKGROUND

Some hybrid vehicles include a starter/generator, such as a belt integrated starter/generator (BISG) that is connected to a front end accessory drive (FEAD). The BISG is electrically connected to a battery. The BISG may be used to provide additional drive torque and to charge the battery through regenerative braking.

SUMMARY

According to one embodiment, a hybrid vehicle includes an engine, an electric machine configured to apply a negative torque during regenerative braking, and a multi-speed transmission coupled to the engine and having multiple discrete gear ratios. A controller is programmed to, in response to a request to decelerate the vehicle, command a shift of the transmission to a one of the gear ratios that is predetermined to rotate the electric machine at a speed that generates a regenerative-braking torque corresponding to a target deceleration of the vehicle without application of friction brakes.

According to another embodiment, a hybrid vehicle includes an engine having a crankshaft, an electric machine driveably connected to the crankshaft and configured to apply a positive torque to the crankshaft during propulsion of the vehicle and to apply a negative torque during regenerative braking, and a multi-speed transmission coupled to the crankshaft and having multiple discrete gear ratios. A vehicle controller is programmed to, in response to a request to decelerate the vehicle, identify, for each of a plurality of the gear ratios, a predetermined deceleration of the vehicle associated with the transmission being in that gear ratio absent application of friction brakes, and compare the predetermined decelerations with a target deceleration and select the one of the gear ratios having a predetermined deceleration closest to the target deceleration. The controller is further programmed to issue a command to shift the transmission to the one of the gear ratios, and command a regenerative torque to the electric machine associated with the one of the gear ratios to achieve the target deceleration without application of the friction brakes.

According to yet another embodiment, a method of regenerative braking a hybrid vehicle with a multi-speed transmission includes identifying, for each gear ratio of the transmission, a predetermined deceleration of the vehicle associated with the transmission being in that gear ratio absent application of friction brakes; comparing the predetermined decelerations with a target deceleration and selecting the one of the gear ratios having a predetermined deceleration closest to the target deceleration; issuing a command to shift the transmission to the one of the gear ratios; and commanding an electric machine to produce a regenerative braking torque associated with the one of the gear ratios to achieve the target deceleration without application of the friction brakes.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
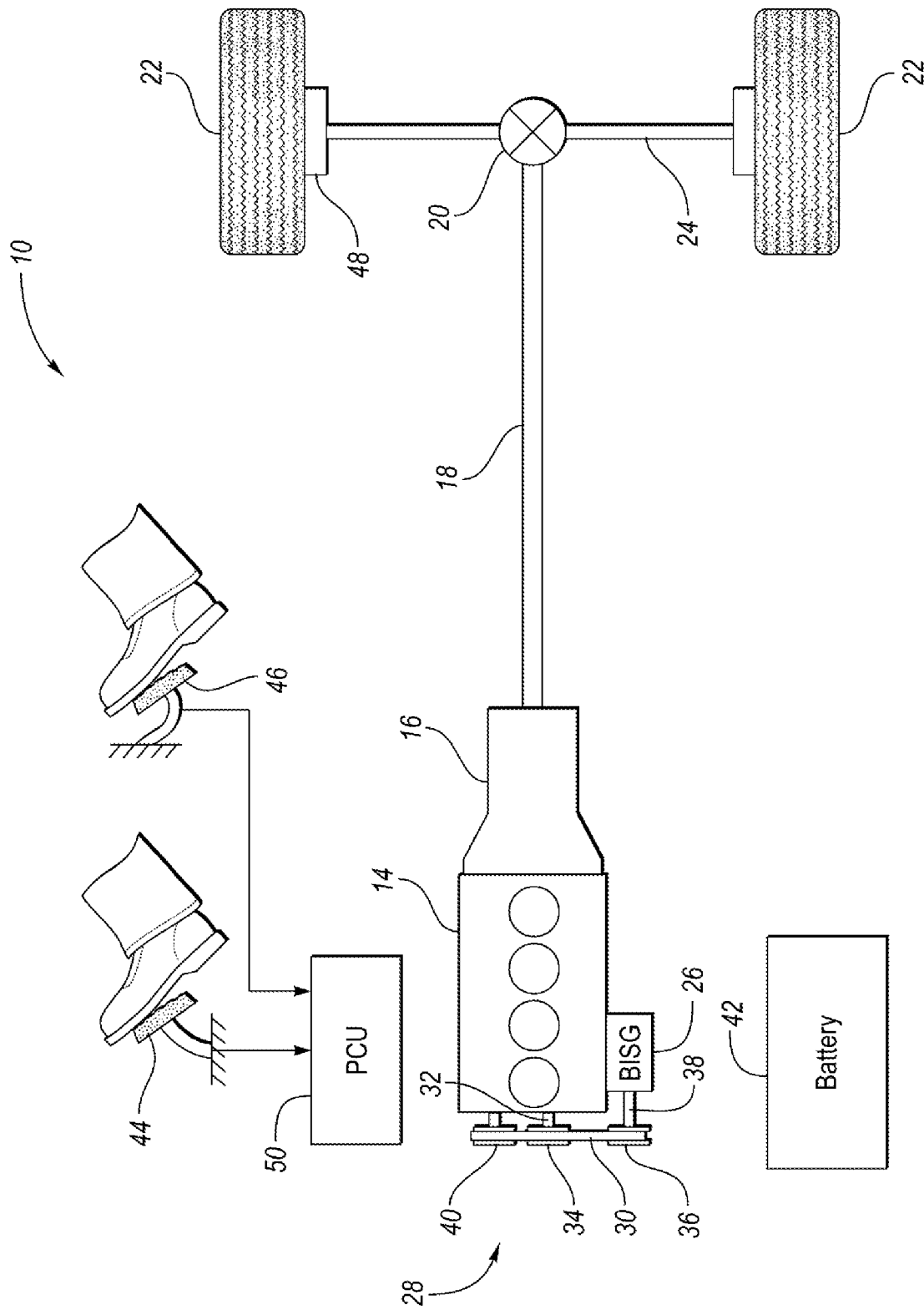
FIG. 1 is a diagram of a hybrid vehicle including a belt integrated starter-generator.

Referring to FIG. 1, a schematic diagram of a hybrid electric vehicle 10 is illustrated according to an embodiment of the present disclosure. The vehicle 10 includes a powertrain 12. The powertrain 12 includes an engine 14 that drives a transmission 16, e.g., a multiple step-ratio transmission. The engine 14 may be an internal-combustion engine fueled by gasoline, diesel, or natural gas, etc. The output of the transmission 16 is coupled to a driveshaft 18 that transmits torque to a differential 20. The differential 20 distributes torque to the wheels 22 via shafts 24. The example vehicle 10 is shown with as rear-wheel drive, but maybe front-wheel drive, all-wheel drive, or four-wheel drive in other embodiments.

The transmission 16 includes multiple discrete gear ratios, typically called "gears." For example, the transmission 16 may include 5, 6, 7, etc., gears. Each of the gears have a unique gear ratio between the input shaft of the transmission and the output shaft of the transmission. First gear is the lowest gear and has the largest torque multiplication and the slowest speed multiplication at the output shaft. Top gear, such as sixth gear in a six-speed transmission, has the smallest torque multiplication and the fastest speed multiplication at the output shaft. The transmission 16 may be an automatic or a manual. In an automatic transmission, the controller controls the changing of the gear ratios by automatically engaging and disengaging clutches associated with a gearing arrangement, which may include one or more planetary gear sets. In a manual transmission, the driver manually changes gears by operation of a gear shifter.

The powertrain 12 further includes an associated controller 50 such as a powertrain control module (PCM). While illustrated as one controller, the controller 50 may be part of a larger control system and may be controlled by various other controllers throughout the vehicle 10, such as a vehicle system controller (VSC). It should therefore be understood that the PCM 50 and one or more other controllers can collectively be referred to as a "controller" that controls various actuators in response to signals from various sensors to control functions such as operating the engine 14, operating the transmission 16, an electric machine, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The controller 50 may communicate signals to and/or from engine 14, the transmission 16, etc. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, electric machine operation, clutches, and the like. Sensors communicating input through the I/O interface may be used to indicate turbocharger boost pressure, crankshaft position, engine rotational speed (RPM), wheel, vehicle speed, coolant temperature, intake manifold pressure, accelerator-pedal position, ignition switch position, throttle-valve position, air temperature, exhaust gas oxygen or other exhaust gas component concentration or presence, intake air flow, transmission gear, ratio, or mode, transmission oil temperature, transmission turbine speed, torque converter bypass clutch status, battery temperature, voltage, current, or state of charge (SOC) for example.

The vehicle 10 includes a BISG 26 (sometimes called a Po motor/generator) that is connected to the FEAD 28. The BISG 26 generally replaces the alternator. The BISG 26 is an electric machine configured to act as a motor or a generator. BISG 26 may be a three-phase electric motor. The FEAD 28 includes a tension member, e.g., a belt 30, that operably couples the BISG 26 to the crankshaft 32 of the engine 14.

For example, the engine 14 includes an associated pulley 34 that is supported on the crankshaft 32 and the BISG 26 includes an associated pulley 36 that is supported on a shaft 38 of the BISG 26. The shaft 38 may be fixed to the rotor of the BISG 26 and may be referred to as a rotor shaft. The belt 30 is trained over these pulleys so that torque can be transmitted between the engine 14 and the electric machine 26. One or more accessories may include pulleys, generally illustrated as pulley 40, that is also engaged with the belt 30, or with a second belt that connects to the crankshaft. That is, the FEAD may include a single belt (e.g., serpentine belt) or multiple belts. The FEAD 28 allows the accessories to be powered by the engine 14, the BISG 26, or combination thereof.

The BISG 26 is electrically connected to a battery 42. The battery 42 may be a high-voltage or a low-voltage battery. For example, the battery 42 and the BISG 26 may be part of a 12V, 48 V, 96 V, etc., electrical system. The BISG 26 may be connected to the battery 42 and other vehicle electrical systems though power electronics (not shown). The BISG 26 may be configured to operate as a motor to start the engine 14 during an engine start-up event, or to provide additional torque to the powertrain 12 during vehicle operations. The BISG 26 may also be configured to receive torque from the engine 14 and operate as a generator to recharge the battery 42 and power electrical loads of the vehicle. The BISG 26 may further be configured to perform regenerative braking. The controller 50 may be configured to transmit signals to the BISG 26 to operate the BISG 26 as either a motor or a generator. The BISG 26 may be configured to provide electrical energy to charge the battery 42 or provide electrical energy to power the vehicle accessories when operating as a generator.

An accelerator pedal 44 is used by the driver of the vehicle to provide a demanded torque, power, or drive command (e.g., "driver-demanded torque") to propel the vehicle. In general, depressing and releasing the accelerator pedal 44 generates an accelerator-pedal position signal that may be interpreted by the controller 50 to determine the driver-demanded torque. A brake pedal 46 is also used by the driver of the vehicle 10 to provide a demanded braking torque to slow the vehicle. In general, depressing and releasing the brake pedal 46 generates a brake-pedal position signal that may be interpreted by the controller 50 as a demand to decrease the vehicle speed. Based upon inputs from at least the accelerator pedal 44 and brake pedal 46, the controller 50 commands torque to the engine 14, the BISG 26, and friction brakes 48. The controller 50 is programmed to arbitrate the driver-demanded torque between the engine 14 and the BISG 26, and to arbitrate the braking torque between the regenerative braking via the BISG 26 and the friction brakes 48. In the case of a manual transmission, the vehicle 10 may further include a clutch pedal that operates the clutch connected between the transmission and the engine.

Depending upon the size of the vehicle and the power rating of the BISG 26, the vehicle may be propelled, at least at low speeds, by either the engine 14 or the BISG 26. For example, the vehicle 10 may include an electric creep mode in which the BISG 26 propels the vehicle when the engine 14 is OFF. (Creep refers to movement of the vehicle when the both brake pedal and the accelerator pedal are released. Typical creep speeds are less than 10 miles per hour.) In other situations, both the engine 14 and the BISG 26 act as drive sources to propel the vehicle 10. The engine 14 generates engine power at the crankshaft that is added to by power output from the BISG 26 through the FEAD 28. This combined power is then sent to the driven wheels 22 though the transmission 16 and the drivetrain.

While the BISG 26 is shown as incorporated with a conventional powertrain, the BISG 26 could also be incorporated with a hybrid powertrain. Such an architecture is disclosed in Applicant's U.S. Pat. No. 10,519,917 (issued Dec. 31, 2019), the contents of which are incorporated in their entirety by reference herein.

When the driver releases the accelerator pedal 44, "tips out," or the vehicle controller 50 commands wheel torque to zero, the vehicle begins to coast and decelerate mainly due to engine friction and power draw of the engine-driven accessories. A coasting vehicle has a large amount of inertia and kinetic energy that can be harvested to recharge the battery 42 through regenerative braking via the BISG 26 or other electric machine. The amount of energy captured during regenerative braking is based on the negative torque commanded to the BISG 26 among other factors. (Used here, "negative torque" refers to a braking torque generated when the BISG 26 is acting like a generator.) Commanding a larger power output generally results in greater energy capture than a smaller power output, but also results in more aggressive deceleration of the vehicle. The amount of power commanded to the BISG 26 may be determined by the controller or by the driver. For example, in a series braking system, initial travel of the brake pedal sets the level of regenerative braking and further travel of the brake pedal beyond a threshold engages the friction brakes.

Since the BISG 26 is driveably connected to the crankshaft of the engine, the operation of regenerative braking is affected by the speed of the engine. The BISG 26, like most electric machines, has an operational speed range with varying available power and torque and with varying efficiencies. During testing of an electric machine, an efficiency map may be obtained. The efficiency map may identify the efficiency of the BISG for a given torque and speed for example. At lower engine speed, the BISG 26 has more torque authority and a faster actuation rate than the engine. The BISG 26 has the ability to add and subtract torque about the nominal level delivered by the engine and any other accessories. The speed of the engine can be modified by changing the gear ratio of the transmission to optimize regenerative braking by moving the BISG to a more efficient zone of operation. For example, downshifting the transmission to a lower gear increases the speed of the engine and the BISG 26 and shifting the transmission to a higher gear reduces the speed of the engine and the BISG.

Figure 2:
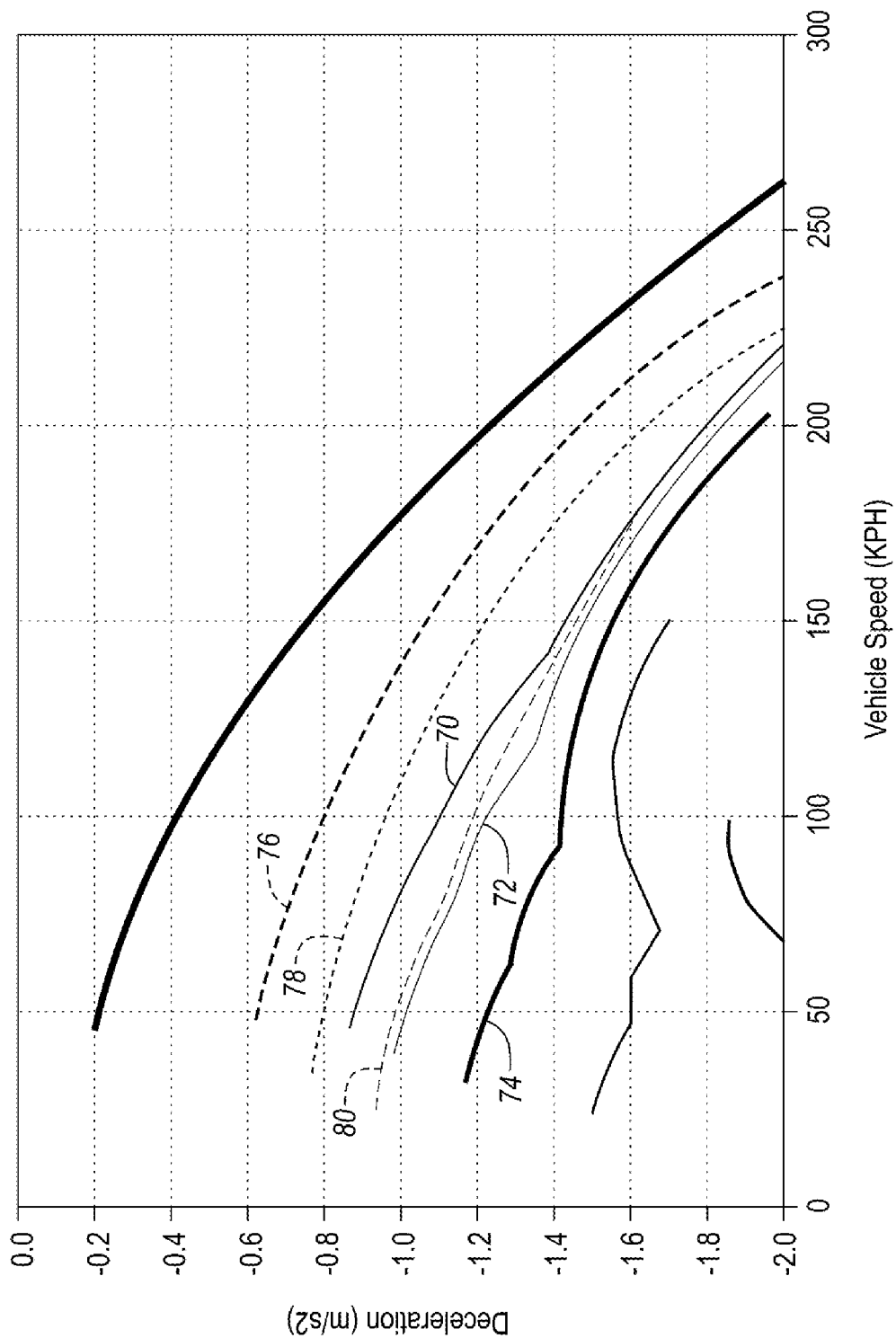
FIG. 2 is a series of plots showing vehicle deceleration achievable in various transmission gear ratios at different speeds of the vehicle.

FIG. 2 illustrates plots of vehicle deceleration for the different gears of the transmission during regenerative braking without applying the friction brakes. These predetermined deceleration values are based on electrical-power output, efficiency, and torque of the BISG as well as the speed of the vehicle. The traces illustrate both maximum deceleration without friction brakes (shown in solid lines) and balanced deceleration without friction brakes (shown in dashed lines). The maximum deceleration traces show the deceleration achievable when the BISG is producing a maximum torque, whereas, in the balanced traces, the BISG is commanded to a lesser torque that 1) provides more efficient operation of the BISG and 2) provides a smoother driving experience. In FIG. 2, traces 70, 72, and 74 show the maximum deceleration in sixth, fifth, and fourth gear, respectively, and traces 76, 78, and 80 shown the balanced deceleration in sixth, fifth, and fourth gear, respectively. Generally, the vehicle deceleration increases as the gear ratios decrease. For example, at 100 kilometers per hour (KPH) the maximum vehicle deceleration in sixth gear without friction brakes (trace 70) is about 1.1 meters per second squared (m/s$^2$) and in fourth gear (trace 72) is about 1.45 m/s$^2$. The deceleration increases based on a combination of factors including increased engine friction (minor factor) and increased speed of the BISG 26 resulting in a more efficient operating range, a larger torque and/or power output (major factor). These vehicle deceleration plots for the different gears at different speeds can be determined during vehicle testing and may be saved is one or more lookup tables. These tables may be stored in memory of one or more controllers such as the controller 50. During a deceleration event, the controller 50 may use these lookup tables to determine the optimum gear for producing a desired vehicle deceleration.

With reference to FIG. 2, an example braking event for the vehicle 10 will be described. If the driver applies the brake pedal to request a deceleration of 1.2 m/s$^2$ at 100 KPH, the presence of parallel brakes prevents delivering this deceleration to a significant degree electrically in sixth gear as the deceleration plot 70 in sixth gear indicates a maximum deceleration of 1.1 m/s$^2$ at a vehicle speed of 100 KPH. Thus, the initial intervention may require application of the friction brakes in addition to the regenerator braking to achieve 1.2 m/s$^2$. As shown in the plot, however, the vehicle is able to achieve a balanced deceleration 80 of 1.2 in fourth gear. That is, if the transmission were in fourth gear, regenerative braking may be used to slow the vehicle without wasting energy at the friction brakes. As will be described in more detail below, the vehicle may command the automatic transmission to shift from sixth gear to fourth gear, or in the case of a manual, instruct the driver to downshift to fourth gear. The system can evaluate available deceleration in each gear based on either the maximum or balanced deceleration data defined by the manufacturer and stored in memory for each gear. Based on these levels, the system can then identify that a downshift to a lower gear would more closely meet this level of deceleration without the need for significant (or any) friction braking while also improving efficiency of the BISG.

In the above example, the balanced deceleration was used to prove driver comfort and efficient operation of the BISG. This, however, is not required: The deceleration could also be achieved in fifth gear according to trace 72. This is particularly relevant in a manual where the driver may not want to shift directly from sixth gear to fourth gear. Additionally, the recommended gear may be the gear that optimizes the efficiency of the BISG, which in may instances, is the balanced deceleration.

The deceleration of the vehicle can be controlled by shifting gears within the transmission to either increase the deceleration, such as by downshifting transmission, or decreasing the deceleration, such as by upshifting the transmission. The predetermined deceleration in the various gears changes with speed. Thus, it may be necessary to perform multiple shifts during a single event to maintain the target deceleration as the vehicle slows down. Typically, this will require additional downshifts to maintain the same deceleration without intervention of the friction brakes.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
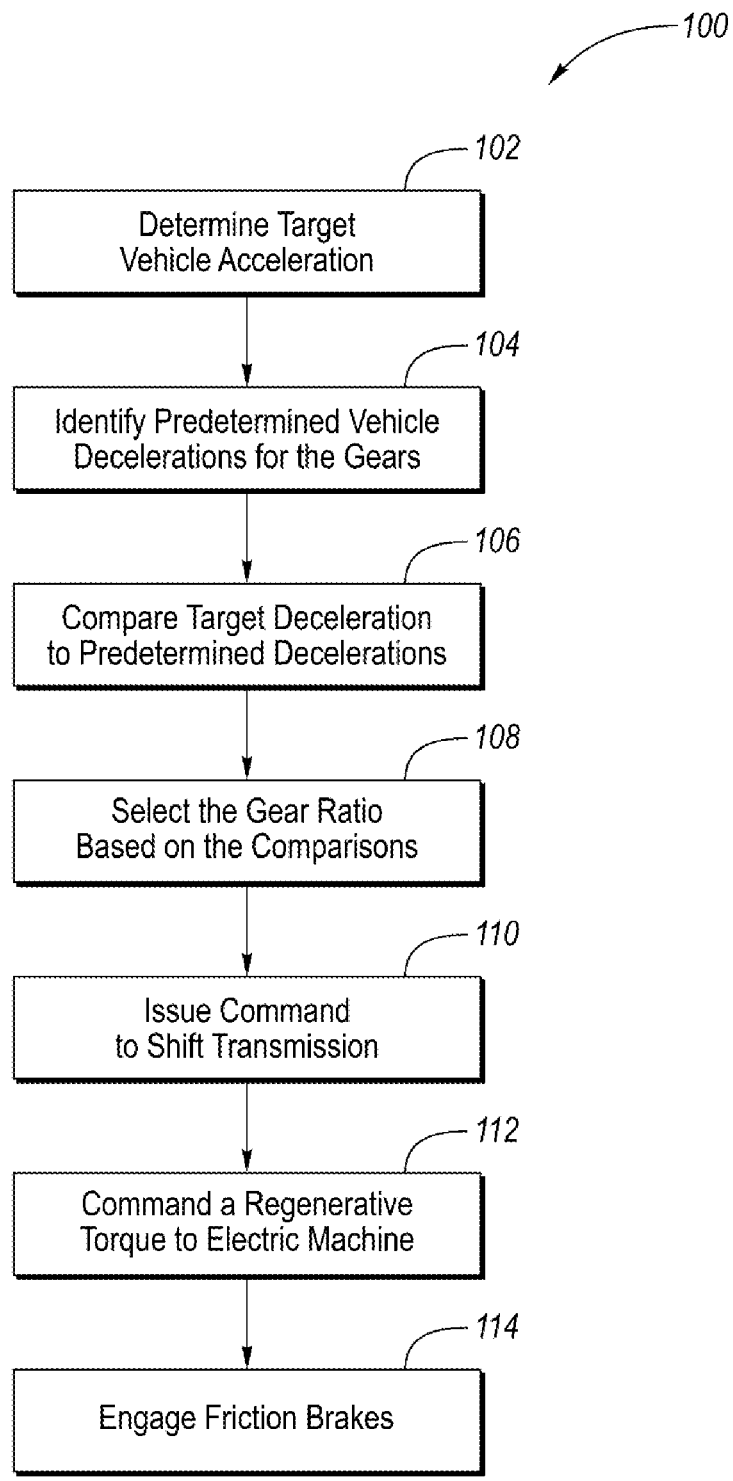
FIG. 3 is a flow chart of an algorithm for controlling the vehicle during a deceleration event.

FIG. 3 is a flowchart 100 of an algorithm for controlling deceleration of vehicle at a target by shifting the transmission to an optimum gear ratio associated with that target. At operation 102, the controller determines a target vehicle deceleration. The target deceleration may be based on actuation of the brake pedal, a grade of the road, vehicle speed, cruise control, and the like. In some instances, the target deceleration may be set by the driver, and/or in other situations, may be set by the vehicle without driver intervention. Once the target deceleration is determined, control passes to operation 104 and the controller identifies predetermined vehicle decelerations for each of the gear ratios in the transmission. One example of the predetermined vehicle decelerations was shown and discussed above with reference to FIG. 2. These vehicle deceleration values for each gear may be saved in memory of the controller and recalled at operation 104. Alternatively, the decelerations may be dynamically calculated for each gear at operation 104 rather than relying on predetermined test data that is stored in memory.

At operation 106, the controller compares the target deceleration to the predetermined decelerations to determine which of the gear ratios most closely matches the target deceleration. For example, the controller may subtract the target deceleration from the predetermined decelerations to determine a difference. The controller may then identify the gear ratio with the smallest difference from the target. At operation 108, the controller selects the gear ratio that will provide the target deceleration.

Once the controller determines the optimum gear ratio for the transmission, the controller issues a command to shift the transmission at operation 110. The command of operation 110 will differ based on whether the transmission is an automatic or a manual. In one or more embodiments, the transmission is an automatic transmission, and the command of operation 110 is a request to shift the automatic transmission to the selected gear ratio. In another embodiment, the transmission is a manual and the command is to the driver. Here, the vehicle may communicate a desired gear to the driver through one or more human machine interfaces (HMI) as will be described in more detail below.

At operation 112, the controller commands a regenerative torque to the electric machine, e.g. the BISG 26, to decelerate the vehicle according to the target deceleration. Commanded torque may include a torque set-point that will create a regenerative braking force on top of the engine friction. The torque set-point may be a function of target deceleration and vehicle speed with clips/modifiers for electric machine speed and torque. In some instances, the target deceleration may exceed the predetermined deceleration of a lowest available gear and thus application of the friction brakes is required. At operation 114, the controller is programmed to, in response to the target deceleration exceeding the predetermined deceleration, command actuation of the friction brakes based on a difference between the target deceleration and the predetermined deceleration of the one of the gear ratios.

Figure 4:
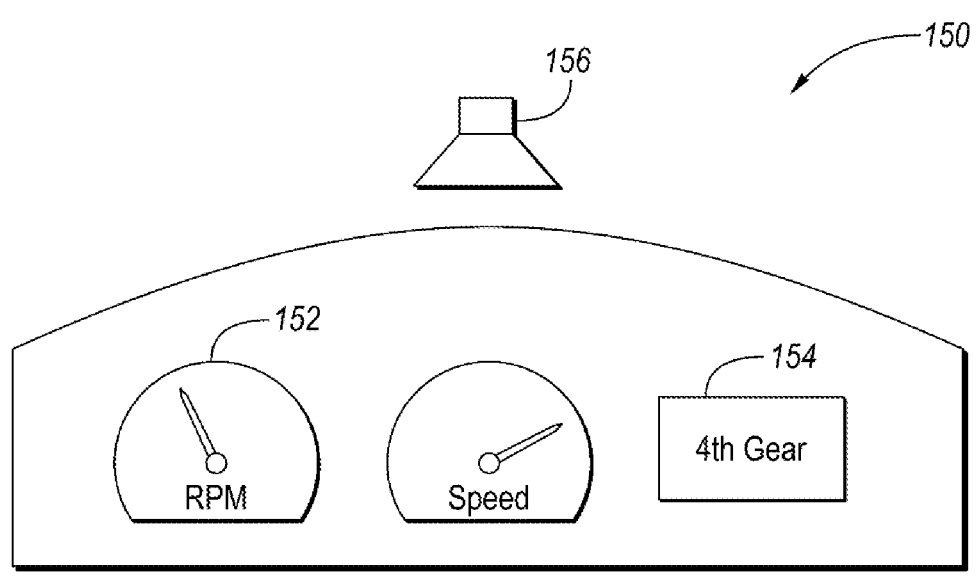
FIG. 4 is a schematic diagram of a dashboard according to one or more embodiments.

FIG. 4 illustrates an example dashboard 150 may be provided within the cabin of the vehicle 10. The dashboard 150 may include gauges 152, such as vehicle speed, engine speed, etc., displays, switches, buttons, touch screens, and the like. In the case of a manual transmission vehicle, the dashboard 150 may include a display 154 used to command shifts to the driver. The display 154 may include any number of graphical representations interpretable by the driver to change a gear of the transmission. For example, the display 154 may include up or down arrows, a commanded gear ratio (such as $4^{th}$ gear, as shown), and combinations thereof. In some embodiments, the display 154 may be replaced with one or more lamps such as an upshift lamp or downshift lamp that illuminate to instruct the driver to upshift or downshift the transmission. The vehicle may also include a speaker 156 enabling auditory commands to the driver. The vehicle may communicate a desired gear ratio of the transmission to the driver through the speaker 156. The command 110, discussed above, may be issued to the driver of a manual transmission through one or more of the displays 154, the speaker 156, or any other mechanism interpretable by the driver. For example, haptic feedback may be provided to the driver through the seat, steering wheel, or other component.

Using the above-described controls and methods, a target deceleration of the vehicle can be achieved through increased regenerative braking and decreased friction braking due to the optimization of the transmission gear ratio for a target deceleration. This may result in increased range, reduced brake wear, and better fuel economy.

While the vehicle 10 is described as being a hybrid having a BISG, the invention may also be used in other vehicle architectures. For example, the vehicle 10 may be a, P2 hybrid with the electric machine between the engine and the transmission, or any other arrangement in which the transmission gear ratio affects the speed of the electric machine.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle comprising:
an engine including a crankshaft;
an electric machine driveably connected to the crankshaft and configured to apply a positive torque to the crankshaft during propulsion of the vehicle and to apply a negative torque during regenerative braking;
a multi-speed transmission coupled to the crankshaft and including multiple discrete gear ratios; and
a controller programmed to, in response to a request to decelerate the vehicle:
identify, for each of a plurality of the gear ratios, a predetermined deceleration of the vehicle associated with the transmission being in that gear ratio absent application of friction brakes,
compare the predetermined decelerations with a target deceleration and select one of the gear ratios having a predetermined deceleration closest to the target deceleration,
issue a command to shift the transmission to the one of the gear ratios, and
command a regenerative torque to the electric machine associated with the one of the gear ratios to achieve the target deceleration without application of the friction brakes.

2. The hybrid vehicle of claim 1, wherein the transmission is an automatic, and wherein the controller is further programmed to shift the transmission to the one of the gear ratios.

3. The hybrid vehicle of claim 1, wherein the transmission is a manual, and wherein the issue a command to shift further includes requesting a driver to shift the transmission to the one of the gear ratios.

4. The hybrid vehicle of claim 1 further comprising a belt-integrated starter-generator system including the electric machine.

5. The hybrid vehicle of claim 1, wherein the predetermined decelerations are based on an electrical-power output of the electric machine and a speed of the vehicle.

6. The hybrid vehicle of claim 1, wherein the controller includes memory storing one or more lookup tables that have, for each of the plurality of the gear ratios, values of the predetermined deceleration for a plurality of speeds of the vehicle, and wherein the predetermined deceleration is identified based on the one or more lookup tables.

7. The hybrid vehicle of claim 6, wherein the values of the predetermined deceleration are based on a torque of the electric machine, a power of the electric machine, and an efficiency map of the electric machine.

8. The hybrid vehicle of claim 1, wherein the target deceleration is based on actuation of a brake pedal.

9. The hybrid vehicle of claim 1, wherein the controller is further programmed to, in response to the target deceleration exceeding the predetermined deceleration of the one of the gear ratios, command actuation of the friction brakes based on a difference between the target deceleration and the predetermined deceleration of the one of the gear ratios.

10. A hybrid vehicle comprising:
an engine;
an electric machine configured to apply a negative torque during regenerative braking;
a multi-speed transmission coupled to the engine and including multiple discrete gear ratios; and
a controller programmed to, in response to a request to decelerate the vehicle, command a shift of the transmission to a one of the gear ratios that is predetermined to rotate the electric machine at a speed that generates a regenerative-braking torque corresponding to a target deceleration of the vehicle without application of friction brakes.

11. The hybrid vehicle of claim 10, wherein the controller includes memory storing at least one lookup table that has, for each of the gear ratios, values of a predetermined deceleration of the vehicle for a plurality of speeds of the vehicle, and wherein the predetermined deceleration of the one of the gear ratios is closer to the target than the predetermined decelerations of other of the gear ratios.

12. The hybrid vehicle of claim 11, wherein the values of the predetermined deceleration are based on a torque limit of the electric machine, a power limit of the electric machine, and an efficiency map of the electric machine.

13. The hybrid vehicle of claim 11, wherein the controller is further programmed to, in response to the target deceleration exceeding the predetermined deceleration of the one of the gear ratios, command actuation of the friction brakes based on a difference between the target deceleration and the predetermined deceleration of the one of the gear ratios.

14. The hybrid vehicle of claim 10, wherein the electric machine is driveably connected to a crankshaft of the engine by a tension member.

15. The hybrid vehicle of claim 10, wherein the transmission is an automatic, and wherein the controller is further programmed to shift the transmission to the one of the gear ratios.

16. The hybrid vehicle of claim 10, wherein the transmission is a manual, and wherein the command a shift further includes requesting a driver to shift the transmission to the one of the gear ratios.

17. The hybrid vehicle of claim 10, wherein the target deceleration is based actuation of a brake pedal.

18. A method of regenerative braking a hybrid vehicle with a multi-speed transmission comprising:
identifying, for each gear ratio of the transmission, a predetermined deceleration of the vehicle associated with the transmission being in that gear ratio absent application of friction brakes;
comparing the predetermined decelerations with a target deceleration and selecting one of the gear ratios having a predetermined deceleration closest to the target deceleration;
issuing a command to shift the transmission to the one of the gear ratios; and
commanding an electric machine to produce a regenerative braking torque associated with the one of the gear ratios to achieve the target deceleration without application of the friction brakes.

19. The method of claim 18 further comprising shifting the transmission to the one of the gear ratios.

20. The method of claim 18, wherein the predetermined decelerations are based on an electrical-power output of the electric machine and a speed of the vehicle.

* * * * *